(12) United States Patent
Kwon et al.

(10) Patent No.: US 9,415,417 B2
(45) Date of Patent: Aug. 16, 2016

(54) SCATTERED POWDER CLEANING DEVICE CAPABLE OF REMOVING SCATTERED POWDER FROM AN INTERNAL SPACE

(71) Applicant: LG Hausys, Ltd., Seoul (KR)

(72) Inventors: Dae-Hoon Kwon, Anyang-si (KR); Youn-Ki Jun, Gwacheon-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 14/438,115

(22) PCT Filed: Oct. 7, 2013

(86) PCT No.: PCT/KR2013/008942
§ 371 (c)(1),
(2) Date: Apr. 23, 2015

(87) PCT Pub. No.: WO2014/073793
PCT Pub. Date: May 15, 2014

(65) Prior Publication Data
US 2015/0238991 A1 Aug. 27, 2015

(30) Foreign Application Priority Data
Nov. 7, 2012 (KR) .................. 10-2012-0125459

(51) Int. Cl.
*B05C 11/00* (2006.01)
*B05C 13/02* (2006.01)
(Continued)

(52) U.S. Cl.
CPC .......... *B05C 11/1021* (2013.01); *B05B 15/1229* (2013.01); *B05C 11/06* (2013.01); *B05C 13/02* (2013.01); *B08B 5/02* (2013.01);
(Continued)

(58) Field of Classification Search
CPC ....... C23C 16/545; B05B 7/1486; B05D 1/12
USPC .................................................. 118/308, 326
See application file for complete search history.

(56) References Cited

U.S. PATENT DOCUMENTS 3,084,662 A * 4/1963 Badger .................... B05C 3/10
118/404
3,841,858 A * 10/1974 Akashi ................ C03C 17/002
118/323
(Continued)

FOREIGN PATENT DOCUMENTS

| KR | 19910002528 B1 | 8/1986 |
|---|---|---|
| KR | 19890012899 A | 9/1989 |
| KR | 20020086791 A | 11/2002 |

OTHER PUBLICATIONS

International Search Report for PCT/KR2013/008942 mailed on Nov. 27, 2013.
(Continued)

*Primary Examiner* — Karl Kurple
(74) *Attorney, Agent, or Firm* — Hauptman Ham, LLP

(57) ABSTRACT

The present invention provides a scattered powder cleaning device, comprising: a case having an exit formed at one side for the access of glass and an internal space; an opening and closing part for opening or closing the exit; a powder spray part provided to the case for spraying a predetermined amount of power at the internal space; and a cleaning part which forcibly scatters the powder dispersed at the internal space by forcibly introducing external air so as to discharge the powder to the outside if the glass escapes from the internal space.

4 Claims, 6 Drawing Sheets

(51) Int. Cl.
  *B05C 11/10* (2006.01)
  *B05C 11/06* (2006.01)
  *B05B 15/12* (2006.01)
  *C03C 17/00* (2006.01)
  *B08B 5/02* (2006.01)
  *B08B 9/00* (2006.01)
  *B08B 15/02* (2006.01)
  *B05D 1/04* (2006.01)
  *B05D 1/36* (2006.01)
  *B05D 5/00* (2006.01)
  *B05D 3/00* (2006.01)

(52) U.S. Cl.
  CPC .................. *B08B 9/00* (2013.01); *B08B 15/02* (2013.01); *C03C 17/002* (2013.01)

(56) References Cited

U.S. PATENT DOCUMENTS

| | | | | |
|---|---|---|---|---|
| 3,884,179 A * | 5/1975 | Szczepanski | B05B 15/04 | 118/324 |
| 4,042,363 A * | 8/1977 | Maeda | B05B 13/041 | 118/65 |
| 4,064,832 A * | 12/1977 | Chujo | B05B 13/041 | 118/323 |
| 4,330,318 A * | 5/1982 | Van Cauter | C03C 17/002 | 427/110 |
| 4,397,259 A * | 8/1983 | Kanda | B05B 13/0207 | 118/323 |
| 4,414,252 A * | 11/1983 | Lampkin | B05B 13/041 | 118/323 |
| 4,545,324 A * | 10/1985 | Browning | B01D 46/26 | 118/309 |
| 4,576,828 A * | 3/1986 | Walker, Jr. | C23C 4/128 | 118/668 |
| 4,791,003 A * | 12/1988 | Bray | B05B 5/08 | 427/233 |
| 4,878,934 A * | 11/1989 | Thomas | C03C 17/002 | 118/326 |
| 4,880,698 A * | 11/1989 | Thomas | C03C 17/002 | 427/126.2 |
| 4,933,211 A | 6/1990 | Sauvinet et al. | | |
| 5,122,394 A * | 6/1992 | Lindner | C03C 17/002 | 118/718 |
| 5,286,295 A * | 2/1994 | Sauvinet | C03C 17/002 | 118/718 |
| 5,792,259 A * | 8/1998 | Yoshioka | B05C 15/00 | 118/319 |
| 6,068,702 A * | 5/2000 | Bertellotti | B05B 15/1229 | 118/308 |
| 6,103,015 A * | 8/2000 | Zhu | C03C 17/002 | 118/718 |
| 6,419,744 B1 * | 7/2002 | Southworth | B05C 9/14 | 118/58 |
| 6,673,386 B2 * | 1/2004 | Komyoji | H01J 9/02 | 118/308 |
| 8,113,139 B2 * | 2/2012 | Kim | C23C 2/20 | 118/62 |
| 8,136,475 B2 * | 3/2012 | Davis | B05B 13/02 | 118/301 |
| 9,303,316 B1 * | 4/2016 | Shufflebotham | C23C 14/566 | |
| 2002/0092468 A1 | 7/2002 | Mauchle et al. | | |
| 2007/0163493 A1 * | 7/2007 | Lacchia | B05B 7/1472 | 118/300 |
| 2009/0283031 A1 * | 11/2009 | Grasso | B05B 15/1225 | 118/104 |
| 2010/0162765 A1 * | 7/2010 | Wang | C03C 17/002 | 65/157 |
| 2010/0239762 A1 * | 9/2010 | Schulze | C23C 14/566 | 427/294 |
| 2011/0039481 A1 | 2/2011 | Hiraga et al. | | |
| 2012/0094031 A1 * | 4/2012 | Schmitt | B05B 13/0221 | 427/541 |
| 2012/0304924 A1 * | 12/2012 | Fernholz | B05B 13/0221 | 118/500 |
| 2015/0101531 A1 * | 4/2015 | Hasebe | B05B 13/0228 | 118/704 |

OTHER PUBLICATIONS

European Search Report mailed on Apr. 25, 2016 corresponding to European Patent Application 13853005.0 citing the above reference(s).

* cited by examiner

SCATTERED POWDER CLEANING DEVICE CAPABLE OF REMOVING SCATTERED POWDER FROM AN INTERNAL SPACE

TECHNICAL FIELD

The present invention relates to a scattered powder cleaning device, and more particularly, to a scattered powder cleaning device that can effectively remove scattered powder by generating a forcible flow of the scattered powder in manufacture of glass.

BACKGROUND ART

In general, powder formed of a certain substance is injected and applied to a glass pane to impart desired properties to the glass pane.

Next, a conventional process of injecting and applying powder to a glass pane will be described.

A glass pane is transferred to a work site at which the process will be performed.

After the glass pane is transferred to the work site, a powder injector injects powder toward the glass pane.

The injected powder is applied to an outer surface of the glass pane.

The powder has a fine particle size and thus can be scattered outside the glass pane during injection of the powder towards the glass pane.

In the related art, a separate vacuum device is used to remove the scattered powder outside the glass pane through vacuum collection below the glass pane.

However, the powder is scattered in the vicinity of the glass pane as soon as injection of the powder.

Therefore, there is a problem in that the scattered powder is accumulated to a certain thickness on sidewalls of a chamber, in which subsequent processes will be performed after the process of applying the powder to the glass pane.

To solve such problems, the powder is removed from the sidewalls by manual operation after opening the chamber, thereby requiring a separate manual cleaning process.

DISCLOSURE

Technical Problem

An aspect of the present invention is to provide a scattered powder cleaning device which can effectively collect and remove scattered powder by generating a forcible flow of the scattered powder in manufacture of glass.

Technical Solution

In accordance with one aspect of the present invention, a scattered powder cleaning device including: a case formed at one side thereof with a gate for entrance and exit of glass and having an internal space defined therein; a shut-off member opening and closing the gate; a powder injector provided to the case and injecting a certain amount of powder into the internal space; and a cleaning unit forcibly scattering the powder scattered in the internal space to discharge the powder from the case by forcibly introducing external air into the case, when the glass is shifted from the internal space.

The cleaning unit may include: a suction module suctioning powder present in the internal space of the case; a vacuum pump imparting vacuum suctioning force to the suction module to discharge the powder outside; and a blower provided to the case and forcibly introducing the external air into the internal space of the case.

The suction module may include a lateral suction module and a lower suction module.

The lateral suction module may include a plurality of first vacuum holes formed in sidewalls of the internal space of the case and a plurality of first discharge pipes respectively connected to the first vacuum holes and to the vacuum pump.

The lower suction module may include a plurality of second vacuum holes formed in a lower surface of the internal space of the case and a plurality of second discharge pipes respectively connected to the second vacuum holes and to the vacuum pump.

The first vacuum holes of each of the lateral suction modules may be arranged to face the first vacuum holes of the other lateral suction module in the internal space of the case.

The first vacuum holes and the second vacuum holes may have a circular hole shape or an elongated hole shape.

The vacuum pump may include: a first vacuum pump which imparts vacuum suctioning force to the lateral suction module; and a second vacuum pump which imparts vacuum suctioning force to the lower suction module.

The first vacuum pump and the second vacuum pump may be operated by a control signal from a controller.

The case may be provided therein with a sensor for sensing the presence of the glass and transmitting a sensing signal to the controller.

The case may be further provided with a rotation motor which operates the shut-off unit to open and close the gate in response to a control signal of the controller.

The controller may operate the first vacuum pump to discharge the power outside through the lateral suction modules when the glass is placed in the internal space of the case and the gate is closed.

The controller may control the blower to generate forcible circulation of the external air within the internal space of the case and may operate the first vacuum pump and the second vacuum pump to discharge the powder outside through the lateral suction modules and the lower suction module when the glass is removed from the case and the gate is closed.

In the case, the first vacuum holes and the second vacuum holes may be formed in a body having a plate shape.

The body may be arranged to form a wall of the case, the body may be rotatably supported by a rotational shaft disposed in the case such that the body can be rotated up and down or left and right in the wall of the case, an edge of the body may be connected to an edge of the case by a pleated cover, and the rotational shaft may be rotated in response to the control signal from the controller.

The first vacuum holes and the second vacuum holes may be formed in a body having a plate shape, and the body may be detachably fitted into the wall of the case.

The first vacuum holes may be detachable from the first discharge pipes, and the second vacuum holes may be detachable from the second vacuum holes.

Advantageous Effects

According to embodiments of the present invention, the scattered powder cleaning device has an effect of efficiently collecting and removing scattered powder by forcibly scattering the powder in manufacture of glass.

BEST MODE

Hereinafter, a scattered powder cleaning device according to one embodiment of the present invention will be described with reference to the accompanying drawings.

Figure 1:
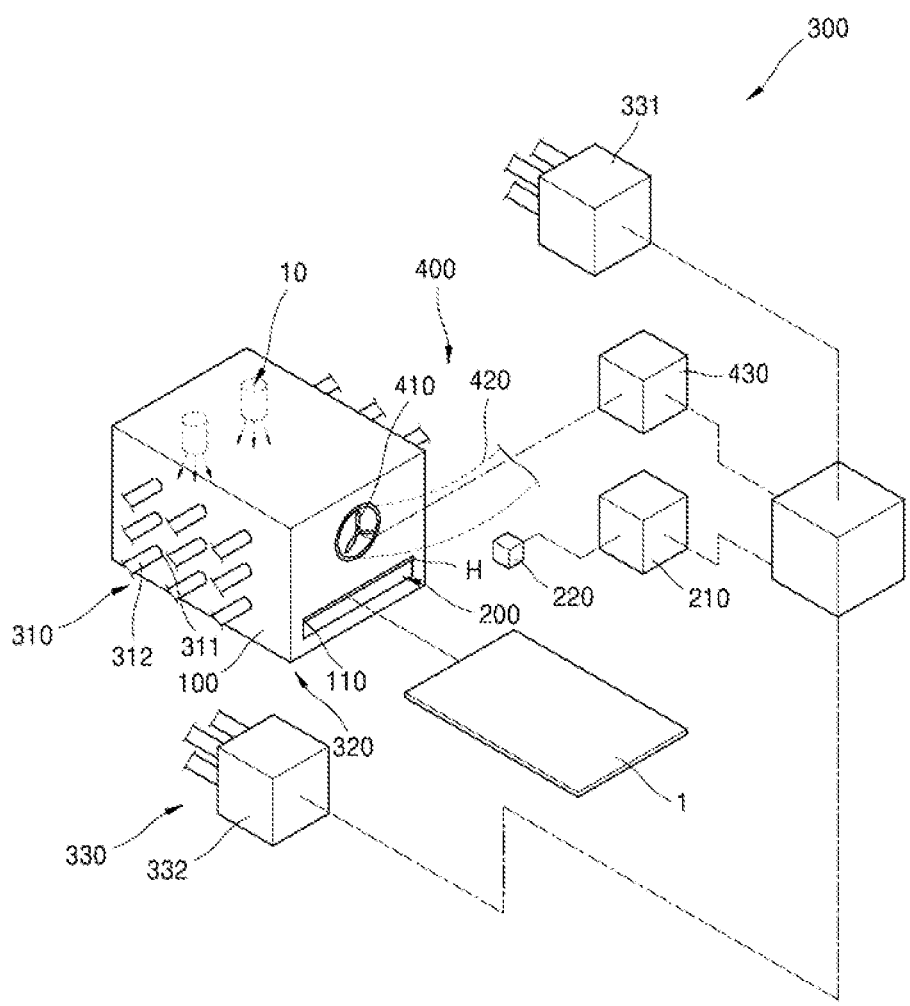
FIG. 1 is a perspective view of a scattered powder cleaning device according to one embodiment of the present invention.
Figure 2:
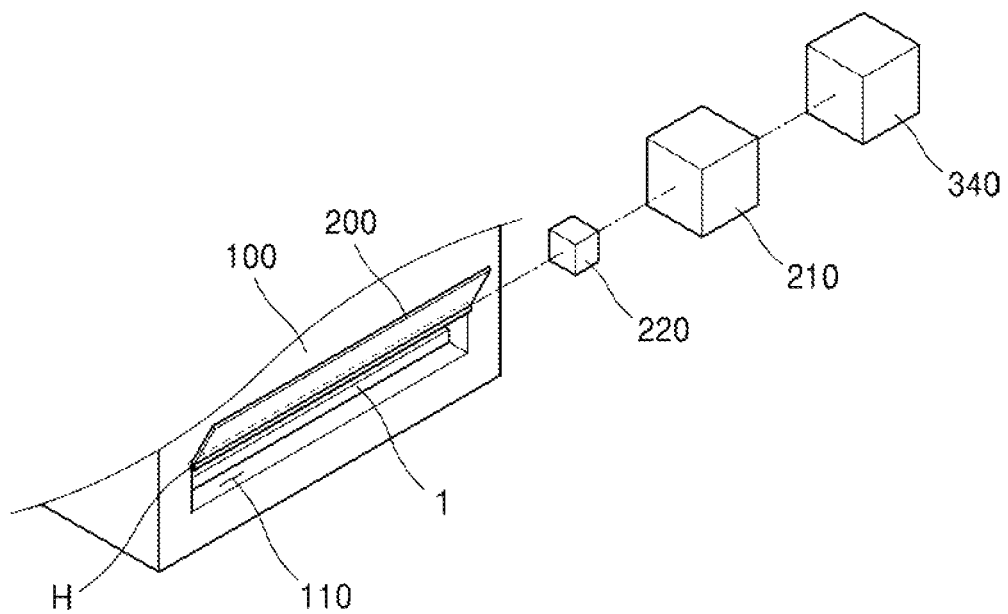
FIG. 2 is a partially perspective view of one example of a shut-off member according to the embodiment of the present invention.

FIG. 1 is a perspective view of a scattered powder cleaning device according to one embodiment of the invention.

Referring to FIG. 1, the scattered powder cleaning device according to the embodiment of the invention includes a case 100, a shut-off member 200, a powder injector 10, and a cleaning unit 300.

The case 100 may have a rectangular box shape to have a space defined therein.

The case 100 is formed at one side thereof with a gate 110 for entrance and exit of glass 1.

Here, the glass 1 may be a glass pane having a predetermined thickness.

The gate 110 is formed at a lower portion of one side of the case 100 and is formed as an opening corresponding to a width and thickness of the glass 1. The opening may have a width and height not allowing plural panes of glass 1 stacked one above another to pass therethrough.

Thus, the gate 110 may have a minimum size sufficient to allow entrance and exit of the glass 1 therethrough.

The powder injector 10 is disposed at an upper surface of the internal space of the case 100. The powder injector 10 is a device for injecting powder received from an outside toward the glass 1 inserted into the case 100.

The cleaning unit 300 is a device for removing powder remaining in the internal space of the case 100 by generating a forcible flow of the scattered powder when the powder is injected toward the glass 1 in the case 100 and after the glass 1 is removed from the case 100.

The configuration of the cleaning unit 300 will be described in detail.

The cleaning unit 300 is constituted by suction modules, a vacuum pump 330, and a blower 400.

The suction modules are disposed at opposite side surfaces and a lower surface of the case 100 to discharge the powder from the case by suctioning the powder.

The suction modules include a lateral suction module 310 and a lower suction module 320.

The lateral suction module 310 includes a plurality of first vacuum holes 311 formed in sidewalls and facing each other in the internal space of the case 100, and a plurality of first discharge pipes 312 respectively connected to the first vacuum holes 311.

Figure 3:
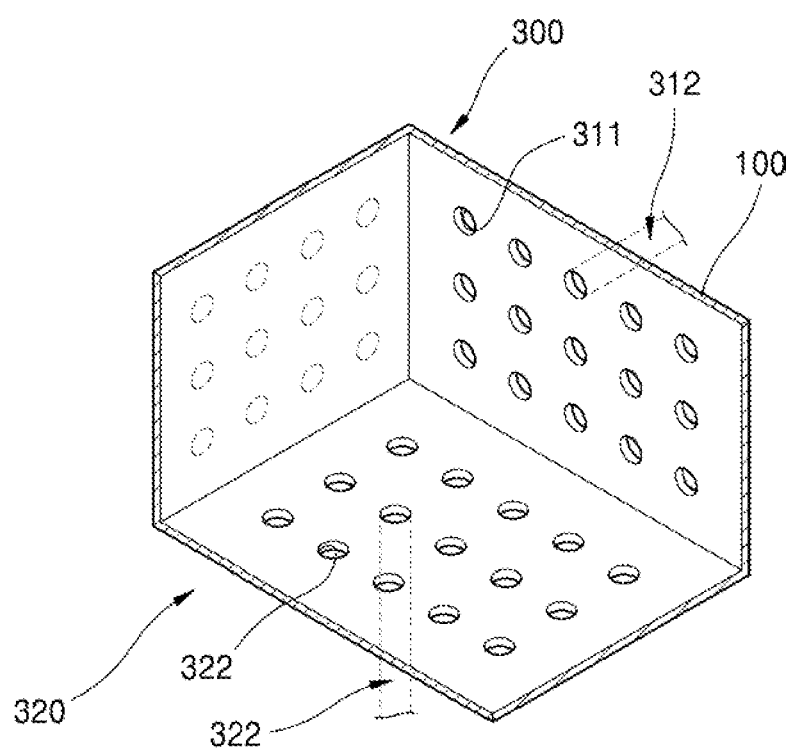
FIG. 3 is a partially cutaway perspective view of a case according to one embodiment of the present invention.

Thus, as shown in FIG. 3, the plural first vacuum holes 311 are arranged at regular intervals on each of the opposite sidewalls of the case 100.

The first vacuum holes 311 may have inner diameters gradually increasing from a lower portion to an upper portion of the case 100.

The plurality of first discharge pipes 312 may be connected in one-to-one relationship to the first vacuum holes 311 on the opposite sidewalls of the case 100.

The first vacuum holes 311 are holes for suctioning the powder scattered inside the case 100, and the first discharge pipes 312 are pipes for discharging the powder suctioned through the first vacuum holes 311 to the outside.

Referring to FIG. 3, the lower suction module 320 includes a plurality of second vacuum holes 321 formed in the lower surface of the case 100, and a plurality of second discharge pipes 322 respectively connected to the second vacuum holes 321.

The second vacuum holes 322 may also be arranged at regular intervals on the lower surface of the case 100.

Further, although the second vacuum holes 322 may have the same inner diameter, the second vacuum holes 322 may have inner diameters gradually increasing from the center of the lower surface of the case 100 to an outer periphery thereof.

The vacuum pump 330 may impart vacuum suctioning force to each of the lateral suction module 310 and the lower suction module 320.

The vacuum pump 330 includes a first vacuum pump 331 and a second vacuum pump 332.

The first vacuum pump 331 is connected to the plurality of first discharge pipes 312, which are connected to the first vacuum holes 311 at the opposite sidewalls of the case 100, and provides the vacuum suctioning force through the first discharge pipes 312.

Further, the second vacuum pump 332 imparts vacuum suctioning force to the lower suction module 320.

That is, the second vacuum pump 332 is connected to the plurality of second discharge pipes 322, which are connected to the plurality of second vacuum holes 321 at the lower surface of the case 100, and provides the vacuum suctioning force through the second discharge pipes 322.

Each of the first and second vacuum pumps 331, 332 may be electrically connected to the controller 340 to be operated by a control signal from the controller 340.

In addition, the case 100 is provided with a blower 400 at a front side thereof, that is, on the wall in which the gate 110 is formed.

The blower 400 may include a blowing fan 410.

The blowing fan 410 is disposed on the front side of the case 100 and is connected to a tube 420 having a predetermined length. The tube 420 serves to guide inflow of external air.

Further, the blowing fan 410 is operated to rotate by a blowing motor 430, and the blowing motor 430 is operated by a control signal from the controller 340.

The gate 110 is formed below the blowing fan 410 of the case 100 and is provided with the shut-off member 200.

The shut-off member 200 may be a door for opening and closing the gate 110. The shut-off member 200 may be hingedly coupled to the gate 110 to open and close the gate 110.

An upper end of the shut-off member 200 is hingedly coupled to an upper end of the gate 110 such that the shut-off member 200 can rotate up and down to open and close the gate 110.

Further, the shut-off member 200 is rotated up and down about a hinge H by rotational force of a rotation motor 210.

The rotation motor 210 is rotated by a control signal of the controller 340.

In addition, the rotation motor 210 may be connected to an open-detection sensor 220 that transmits an open-detection signal to the controller 340 when the shut-off member 200 is rotated upward to open the gate 110.

Further, the cleaning device may be further provided with a sensor (not shown) that senses the glass 1 moving in and out of the case 100, determines the presence of the glass 1 in the internal space of the case 100, and transmits a sensing signal to the controller 340.

Modes For Invention

Next, operation of the scattered powder cleaning device according to the embodiment of the invention will be described.

Figure 4:
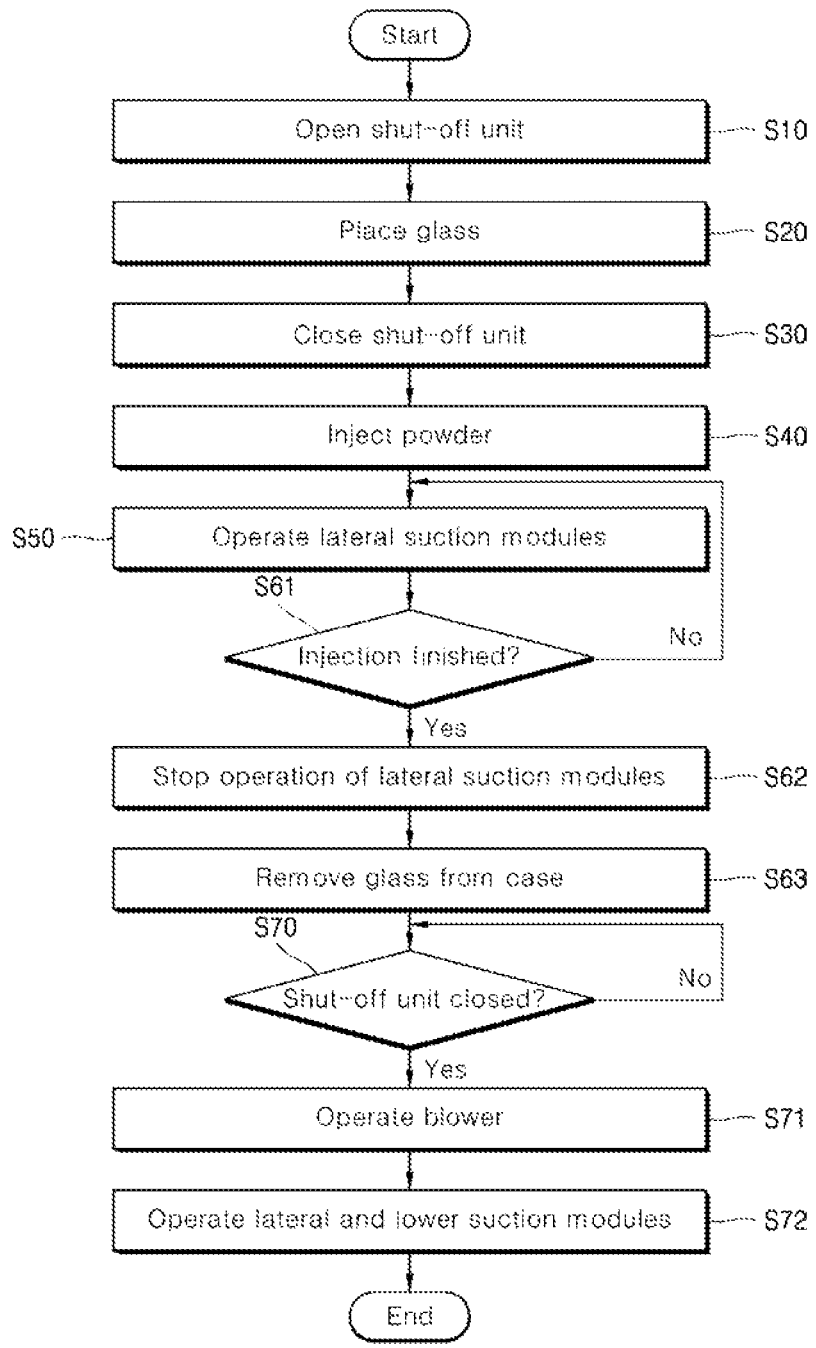
FIG. 4 is a flowchart showing operation of the scattered powder cleaning device according to the embodiment of the present invention.

FIG. 4 shows operation of a scattered powder cleaning device according to one embodiment of the invention. In the following description, reference numerals for elements of the cleaning device are the same as those of the cleaning device shown in FIG. 1 and FIG. 3.

Referring to FIG. 4, the shut-off member 200 is opened (S10).

The controller 340 operates the rotation motor 210 to rotate such that the shut-off member 200, i.e. a door, can be rotated upward to open the gate 110.

Then, the open-detection sensor 220 senses an upward rotation of the shut-off member 200 and transmits a corresponding sensing signal to the controller 340.

Next, the glass 1 is inserted into the case 100 through the gate 110 by a transfer device or unit (not shown) (S20).

Then, a sensor (not shown) disposed in the case 100 senses insertion of the glass 1 into the case 100 and transmits a corresponding signal to the controller 340.

The sensor may be an optical sensor or an ultrasonic sensor.

Then, the controller 340 operates the rotation motor 210 such that the shut-off member 200 can rotate down to close the gate 110 (S30).

Further, the controller 340 controls the powder injector 10 to inject a certain amount of powder to the glass from above the glass (S40).

At the same time, the controller 340 operates the lateral suction modules 310 (S50).

Thus, the first vacuum pump 331 imparts vacuum suctioning force through the plurality of first discharge pipes 311.

The powder injected by the powder injector 10 and scattered inside the case 100 is vacuumed through the plurality of first vacuum holes 311 formed through the opposite sidewalls of the case 100 and flows into the plurality of first discharge pipe 312 to be discharged to the outside.

Further, the controller 340 monitors an injecting operation of the powder injector 10, and determines whether the injecting operation is finished (S61).

When injection of the powder is finished, the controller 340 operates the rotation motor 210 to rotate the shut-off member 200 upward to open the gate 110 in order to discharge the glass 1.

At this time, the open-detection sensor 220 sends the controller 340 a signal informing that the shut-off member 200 is open.

Simultaneously, the controller 340 stops operation of the lateral suction module 310 (S62).

Further, the glass 1 is removed by the transfer device (S63). At the same time, the sensor senses the absence of the glass 1 within the case 100 and transmits a corresponding signal to the controller 340.

After the glass 1 is removed from the case, the controller 340 controls the rotation motor 210 to rotate the shut-off member 200 down to close the gate 110. The closed state of the shut-off member 200 is determined by the controller 340 based on the signal from the open-detection sensor 220 (S70).

After closing the gate 110, the controller 340 operates the blower 400 (S71).

That is, the controller 340 operates the blowing motor 430 such that the blowing fan 410 disposed on the front side of the case 100 can rotate at a certain speed to introduce external air into the case 100 through the tube 420, thereby generating a forcible flow of the scattered powder.

Accordingly, the powder remaining in the case 100 can be scattered by the forcible flow of the scattered powder.

Further, the controller 340 operates the lateral and lower suction modules 310, 320 (S72).

The lower suction module 320 suctions the powder remaining in the internal space of the case 100 through the second vacuum holes 321 formed in the lower surface of the case 100 and discharges the powder to the outside through the second discharge pipes 322.

According to the embodiment of the invention, the powder scattered inside the case can be removed during a process of coating the glass 1 with the powder, and the powder remaining inside the case 100 can be efficiently discharged to the outside by generating a forcible flow of the powder after the coating process.

Accordingly, the scattered powder cleaning device according to the present invention removes remaining powder from the case during and after a certain process, thereby solving a problem of a product defect caused by accumulation of the remaining powder on glass to be subjected to a subsequent process.

Figure 5:
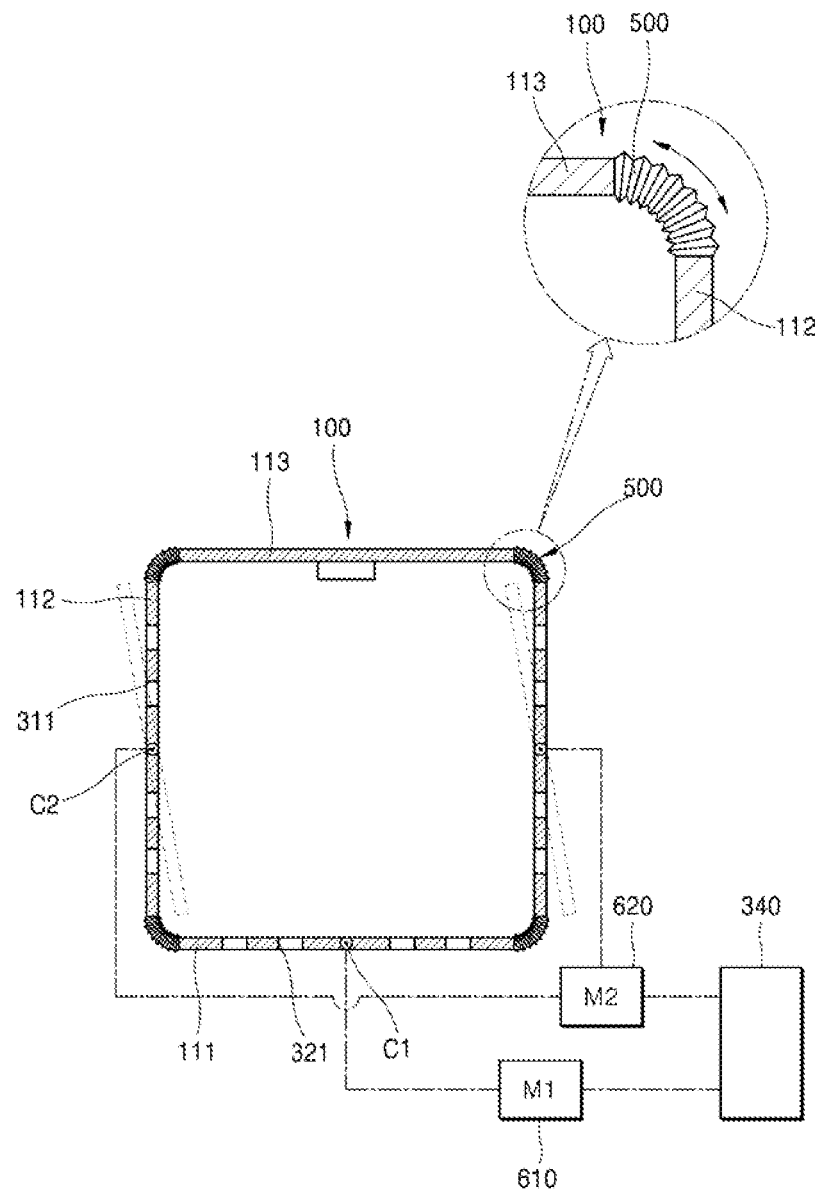
FIG. 5 is a view of a scattered powder cleaning device according to another embodiment of the present invention.

FIG. 5 is a view of a scattered powder cleaning device according to another embodiment of the present invention.

Referring to FIG. 5, the scattered powder cleaning device according to this embodiment includes a lower surface, which is composed of a first body 111 having a plate shape. The first body 111 is provided with a first rotational shaft C1, which is connected to a first motor 610. The first motor 610 rotates the first body 111 in response to a control signal from the controller 340.

Further, the scattered powder cleaning device according to this embodiment includes sidewalls, each of which is composed of a second body 112 having a plate shape. The second body 112 is provided with a second rotational shaft C2, which is connected to a second motor 620. The second motor 620 rotates the second body 112 in response to a control signal from the controller 340.

In addition, pleated covers 500 may connect an edge of an upper wall 113 to upper ends of the second bodies 112 of both sidewalls, and connect an edge of the first body 111 to lower ends of the second bodies 112.

Thus, when the first and second bodies 111 and 112 are moved to each other, the pleated covers 500 may be stretched or shrunk, thereby preventing powder scattered by the blower 400 inside the case 100 from leaking to the outside of the case 100.

According to the embodiment, each of the second bodies 112 forming the sidewalls of the case 100 and the first body 111 forming the lower surface are rotated up and down such that vacuum holes can be continuously varied in position when the powder is suctioned through the first and second vacuum holes 311, 321, thereby enabling more efficient suctioning of the powder scattered in the case 100.

In addition, the first and second vacuum holes 311, 321 may have different sizes.

Further, the first and second vacuum holes 311, 321 may be formed to have inner diameters gradually decreasing from an inner wall toward an outer wall of the case.

Thus, the powder inside the case can be easily removed at high speed through the first and second vacuum holes 311, 321.

In addition, the first and second discharge pipes 321, 322 may be made of a flexible material, thereby solving a problem of pipe fracture due to movement upon rotation of the case.

Further, a mesh having a grid pattern is formed an outer circumference of each of the flexible first and second discharge pipes 321, 322. The mesh may be prepared using a thin wire (not shown), and thus the flexible first and second discharge pipes 321, 322 are prevented from suffering deformation even in the case where the discharge pipes are bent, thereby solving a problem of pipe clogging.

Upon clogging of the pipes, the powder can flow back to the internal space of the case by vacuum pressure.

Figure 6:
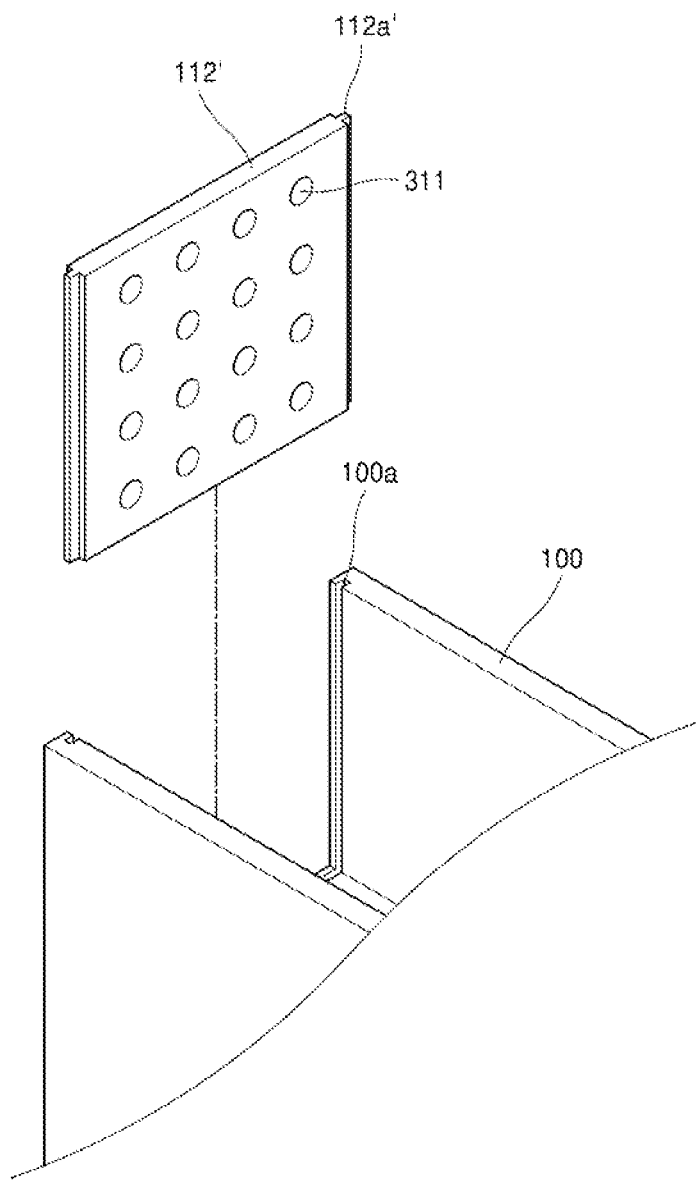
FIG. 6 is a perspective view of one example of a detachable lateral suction module according to one embodiment of the present invention.

FIG. 6 is a perspective view of one example of a detachable lateral suction module according to one embodiment of the present invention.

Referring to FIG. 6, a second body 112' according to one embodiment forms each of sidewalls of the case 100 and is detachable from the case 100.

The second body 112' is formed at opposite ends thereof with projections 112a', and the case 100 is formed with fitting grooves 100a at inner sides of opposite ends thereof, at which the second body 112' is placed, such that the projections 112a' can be fitted into the fitting grooves 100a.

Although not shown, the projections 112a' may be coated with a material having certain elasticity.

Accordingly, when the projections 112a' are fitted into the fitting grooves 100a, the interior of the case 100 can be easily sealed thereby.

According to the embodiment of the invention, the second body 112' forming the sidewall is detachable coupled to the case 100, whereby the second body 112' can be replaced with another second body different in the size or number of first vacuum holes 311.

Although the second body 112' is detachably coupled to the case in this embodiment, the first body forming the lower surface of the case may also be configured in such a manner.

Although the present invention has been described with reference to some embodiments, it will be apparent to those skilled in the art that various modifications can be made without departing from the spirit and scope of the invention.

Therefore, the scope of the invention should be limited only by the accompanying claims and equivalents thereof.

In other words, it should be understood that these embodiments are given by way of illustration only and do not limit the scope of the present invention, and that various modifications, variations, and alterations can be made without departing from the spirit and scope of the invention defined only by the accompanying claims and equivalents thereof.

The invention claimed is:

1. A scattered powder cleaning device comprising:
a case formed at one side thereof with a gate for entrance and exit of glass and having an internal space defined therein;
a shut-off member opening and closing the gate;
a powder injector provided in the case and injecting an amount of powder into the internal space;
a cleaning unit forcibly scattering the powder in the internal space to discharge the powder from the case by forcibly introducing external air into the case, when the glass is shifted from the internal space; and
a controller, wherein the cleaning unit comprises
a suction module configured to suction powder present in the internal space of the case;
a vacuum pump configured to impart vacuum suctioning force to the suction module to discharge the powder outside; and
the case provided with a blower and said blower configured to forcibly introduce the external air into the internal space of the case,
wherein the suction module comprises a lateral suction module and a lower suction module configured to provide suction from a lower side of the glass,
wherein the lateral suction module comprises a plurality of the first vacuum holes formed in sidewalls of the internal space of the case and a plurality of first discharging pipes respectively connected to the first vacuum holes and to the vacuum pump and,
wherein the lower suction module comprises a plurality of second vacuum holes formed in a lower surface of the internal space of the case and a plurality of second discharging pipes respectively connected to the second vacuum holes and connected to the vacuum pump,
wherein the vacuum pump comprises a first vacuum pump configured to impart vacuum suctioning force to the lateral suction module, and a second vacuum pump configured to impart vacuum suctioning force to the lower suction module,
wherein the controller is configured to generate a control signal to operate the first vacuum pump and the second vacuum pump,
wherein the case comprises a sensor configured to sense presence of the glass and transmit a sensing signal to the controller, and a rotation motor configured to operate the shut-off unit to open and close the gate in response to a control signal of the controller
wherein the controller is configured to operate the first vacuum pump to discharge the powder outside through the lateral suction modules when the glass is placed in the internal space of the case and the gate is closed, and
wherein the controller is configured to control the blower to generate forcible circulation the external air within the internal space of the case and operate the first vacuum pump and the second vacuum pump to discharge the powder outside through the lateral suction modules and the lower suction module when the glass is removed from the case and the gate is closed,
wherein in the case,
the first vacuum holes and the second vacuum holes are formed in a body having a plate shape,
the body is arranged to form a wall of the case and the body is rotatably supported by a rotational shaft disposed in the case such that the body can be rotated up and down or left and right in the wall of the case,
an edge of the body is connected to an edge of the case by a pleated cover, and the rotational shaft is rotated in response to a control signal from the controller.

2. The scattered powder cleaning device according to claim 1, wherein the first vacuum holes of each of the lateral suction modules are arranged to face the first vacuum holes of the other lateral suction module in the internal space of the case.

3. The scattered powder cleaning device according to claim 1, wherein the first vacuum holes and the second vacuum holes have a circular hole shape or an elongated hole shape.

4. The scattered powder cleaning device according to claim 1, wherein
the body is detachably fitted into the wall of the case, and the first vacuum holes are detachable from the first discharging pipes, and the second vacuum holes are detachable from the second vacuum holes.

* * * * *